United States Patent [19]
DeMoss et al.

[11] Patent Number: 5,418,925
[45] Date of Patent: May 23, 1995

[54] FAST WRITE I/O HANDLING IN A DISK ARRAY USING SPARE DRIVE FOR BUFFERING

[75] Inventors: Robert A. DeMoss, Wichita; Keith B. DuLac, Derby, both of Kans.

[73] Assignee: AT&T Global Information Solutions Company, Dayton, Ohio

[21] Appl. No.: 966,107

[22] Filed: Oct. 23, 1992

[51] Int. Cl.⁶ ............................................. G06F 13/00
[52] U.S. Cl. .................... 395/425; 371/10.1; 395/325
[58] Field of Search ................ 395/425, 575, 325; 371/11.1, 40.2, 10.1

[56] References Cited

U.S. PATENT DOCUMENTS

| | | | |
|---|---|---|---|
| 4,914,656 | 4/1990 | Dunphy, Jr. et al. | 371/10.2 |
| 4,942,579 | 7/1990 | Goodlander et al. | 371/51 |
| 5,124,987 | 6/1992 | Milligan et al. | 371/10.1 |

*Primary Examiner*—David L. Robertson
*Assistant Examiner*—Sheela Nadig
*Attorney, Agent, or Firm*—James M. Stover; Douglas Foote

[57] ABSTRACT

A method for reducing the apparent response time for write I/O operations initiated by a host system to a RAID level 3, 4 or 5 disk array including a spare disk drive. The disclosed method comprises the steps of (1) saving write data received by the disk array from the host system directly to the spare drive, (2) issuing a write complete status signal to the host system indicating completion of the host write I/O operation, thus freeing the host processor to perform other functions, and (3) transferring the data saved to the spare drive to the active drives within the array. This third step may be executed at any convenient time following the second step. For example, in systems where a host processor functions as the array controller, this third step may be delayed while higher priority tasks are executed. In systems where the disk array includes an array controller, the array controller coordinates the execution of this third step with other controller or array operations to optimize array operation. In additiona, the data from multiple write I/O opertions may be accumulated to the spare drive prior to the step of transferring the data saved to the spare drive to the other, active, drives within the array.

13 Claims, 12 Drawing Sheets

RAID 5

FAST WRITE I/O HANDLING IN A DISK ARRAY USING SPARE DRIVE FOR BUFFERING

The present invention relates to disk array storage devices for computer systems and, more particularly, to a method for improving disk array I/O operations.

BACKGROUND OF THE INVENTION

RAID (Redundant Array of Inexpensive Disks) storage systems have emerged as an alternative to large, expensive disk drives for use within present and future computer system architectures. A RAID storage system includes an array of small, inexpensive hard disk drives, such as the 5¼ or 3½ inch disk drives currently used in personal computers and workstations. Although disk array products have been available for several years, significant improvements in the reliability and performance of small disk drives and a decline in the cost of such drives have resulted in the recent enhanced interest in RAID systems.

Current disk array design alternatives are described in an article titled "A Case for Redundant Arrays of Inexpensive Disks (RAID)" by David A. Patterson, Garth Gibson and Randy H. Katz; University of California Report No. UCB/CSD 87/391, December 1987. The article, incorporated herein by reference, discusses disk arrays and the improvements in performance, reliability, power consumption and scalability that disk arrays provide in comparison to single large magnetic disks. Five disk array arrangements, referred to as RAID levels, are described. The simplest array, a RAID level 1 system, comprises one or more disks for storing data and an equal number of additional "mirror" disks for storing copies of the information written to the data disks. The remaining RAID levels, identified as RAID level 2, 3, 4 and 5 systems, segment the data into portions for storage across several data disks. One or more additional disks are utilized to store error check or parity information. The present invention is primarly directed to improvements in the operation of RAID level 3, 4 and 5 systems.

A RAID level 3 disk array comprises N+1 disks wherein N disks are used to store data, and the additional disk is utilized to store parity information. During RAID level 3 write functions, each block of data is divided into N portions and stripped across the N data disks. The corresponding parity information, calculated by performing a bit-wise exclusive-OR of corresponding portions of the data stripped across the N data drives, is written to the dedicated parity disk. Write operations therefore involve all N+1 drives within the array. When data is read, only the N data disks must be accessed. The parity disk is used to reconstruct information in the event of a disk failure.

Figure 1:
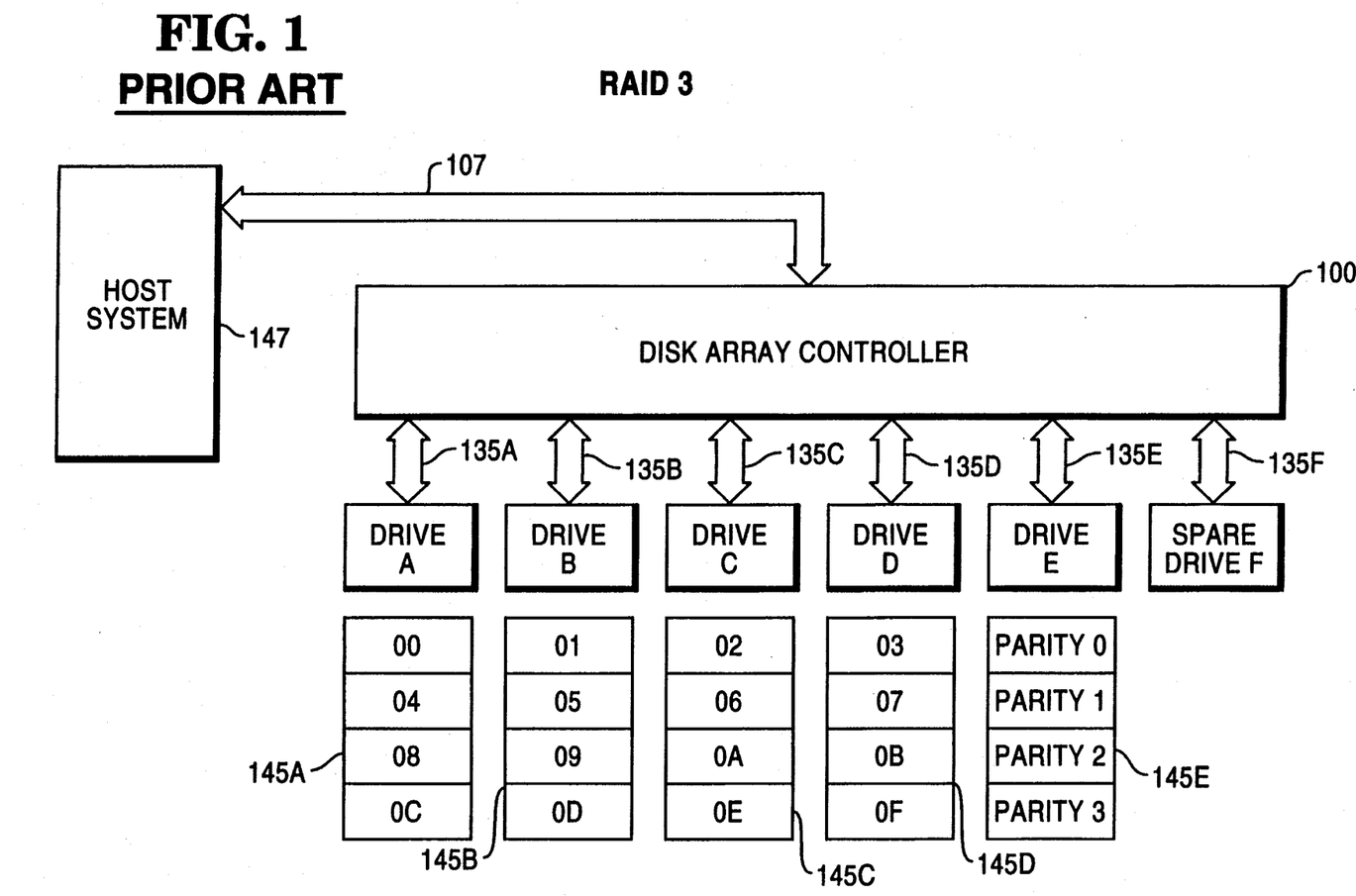
FIG. 1 is a block diagram representation of a RAID level 3 array including four data disk drives and one parity disk drive.

A RAID level 3 system including five drives is shown in FIG. 1. The disk drives are labeled DRIVE A through DRIVE E. Data is striped across disks DRIVE A through DRIVE D, each data disk receiving a portion of the data being saved. Data striping may occur at either the byte or word level. Parity information, generated through a bit-wise exclusive-OR of the data stored on drives DRIVE A through DRIVE D, is saved on drive DRIVE E. Also shown is a sixth, spare disk drive, labeled DRIVE F, which is included in the array as a replacement for any of disks DRIVE A through DRIVE D should one fail. An array controller 100 coordinates the transfer of data between the host system 147 and the array disk drives. The controller also calculates and checks parity information. Blocks 145A through 145E illustrate the manner in which data bytes and parity information are stored on the five array drives. Data bytes are identified with hexadecimal numerals 00 through FF. Parity bytes are identified as PARITY 0 through PARITY 3.

A RAID level 4 disk array is also comprised of N+1 disks wherein N disks are used to store data, and the additional disk is utilized to store parity information. However, data to be saved is divided into larger portions, consisting of one or more blocks of data, for storage among the disks. Writes typically require access to two disks, i.e., one of the N data disks and the parity disk. Read operations typically need only access a single one of the N data disks, unless the data to be read exceeds the block length stored on each disk. As with RAID level 3 systems, the parity disk is used to reconstruct information in the event of a disk failure.

RAID level 5 disk arrays are similar to RAID level 4 systems except that parity information, in addition to the data, is distributed across the N+1 disks in each group. Each one of the N+1 disks within the array includes some blocks for storing data and some blocks for storing parity information. Where parity infomation is stored is controlled by an algorithm implemented by the user. As in RAID level 4 systems, RAID level 5 writes typically require access to two disks; however, no longer does every write to the array require access to the same dedicated parity disk, as in RAID level 4 systems. This feature provides the opportunity to perform concurrent write operations.

Figure 2:
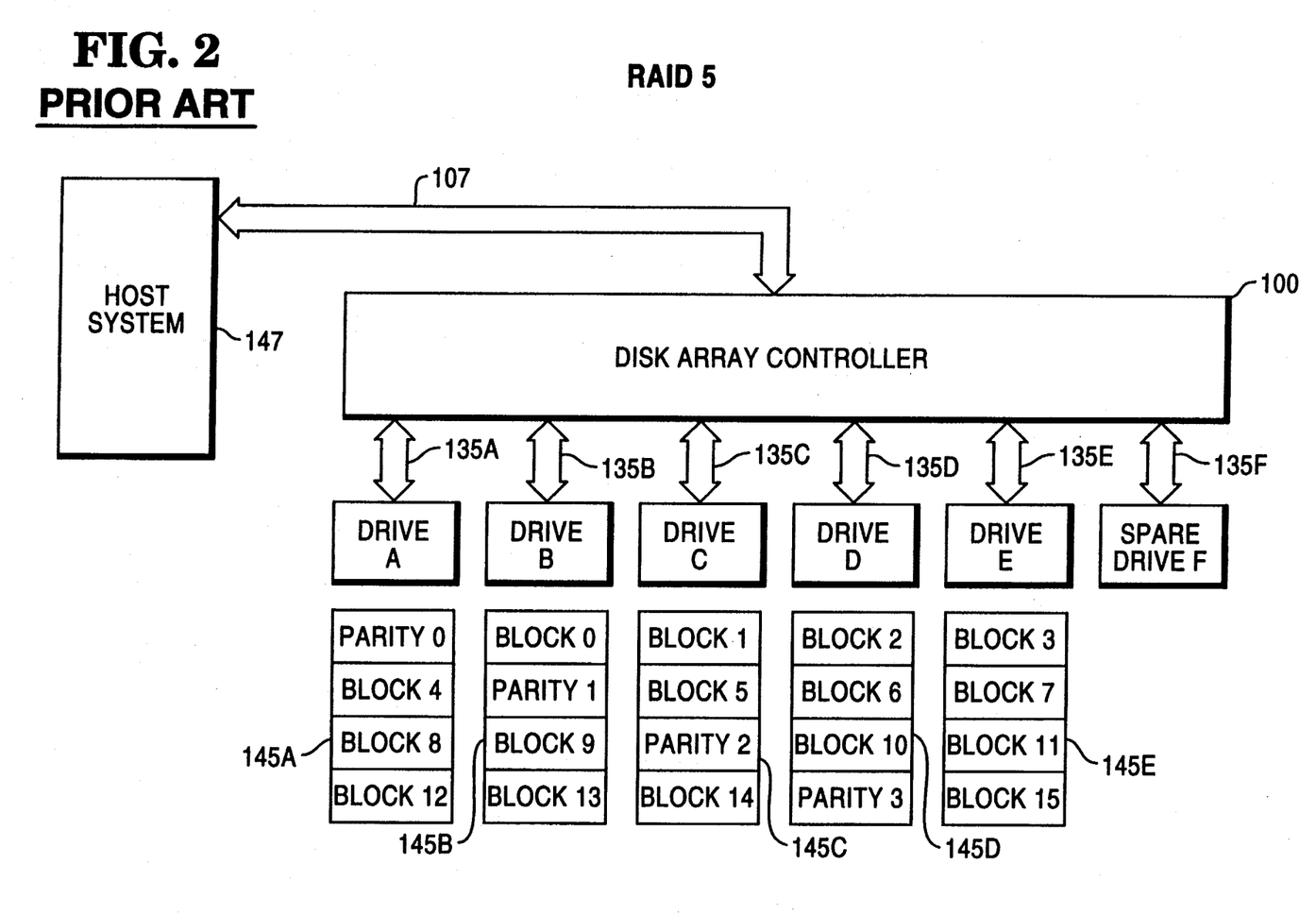
FIG. 2 is a block diagram representation of a RAID level 5 array including five disk drives.

A RAID level 5 system including five data and parity disk drives, DRIVE A through DRIVE E, and a spare disk drive, DRIVE F, is illustrated in FIG. 2. Array controller 100 coordinates the transfer of data between the host system 147 and the array disk drives. The controller also calculates and checks parity information. Blocks 145A through 145E illustrate the manner in which data and parity is stored on the five array drives. Data blocks are identified as BLOCK 0 through BLOCK 15. Parity blocks are identified as PARITY 0 through PARITY 3.

Although many advantages are presented by RAID storage systems in comparison with single disk storage systems, such as increased storage capacity, higher data transfer rates and reduced reliability overhead costs; RAID systems are not without possible performance detriments. Particularly, input/output rates may be reduced and the speed of write operations may decrease significantly, especially for RAID level 4 or 5 systems.

For each of the RAID designs discussed in Patterson, an array write encompasses two or more individual disk write operations. Each individual write operation involves a seek and rotation to the appropriate disk track and sector to be read. The seek time for all disks, i.e., the seek time for the array write, is therefore the maximum of the seek times of each disk.

A typical RAID level 4 or 5 device employs a read-modify-write (RMW) process for writing new data and parity information to the array drives. A read-modify-write process includes the steps of (a) reading old data and old parity information from the disk drives containing the old data and parity information, (b) generating new parity information from the old data, new data received by the disk array, and the old parity information., and (c) writing the new data and new parity information to the disk drives. Thus, an array write operation will require a minimum of two disk reads and two disk writes. More than two disk reads and writes are required for data write operations involving more than one data block. A RAID level 4 or 5 system thus carries a significant write penalty when compared with a single disk storage device or with RAID level 1, 2 or 3 systems.

OBJECTS OF THE INVENTION

It is therefore an object of the present invention to provide a new and useful method for reducing mean write I/O response time for a disk array within a data processing system.

It is another object of the present invention to provide such a method which utilizes one or more spare disk drives within the disk drive for rapid temporary storage of I/O write data.

It is still a further object of the present invention to provide a new and useful method for returning write I/O completion status to a host system without waiting for the completion of write operations within a disk array.

It is yet another object of the present invention to provide a new and useful method for quickly storing write I/O data received from a host system to an array spare drive and returning completion status to the host system without waiting for the completion of write operations in the array.

SUMMARY OF THE INVENTION

There is provided, in accordance with the present invention, a method for reducing the apparent response time for write I/O operations initiated by a host system to a disk array which includes a spare disk drive. The method is directed particularly to an array wherein data and parity information is distributed among several active drives, such as RAID level 3 and 5 systems. The method of the present invention comprises the steps of (1) saving write data received by the disk array from the host system directly to the spare drive, (2) issuing a write complete status signal to the host system indicating completion of the host write I/O operation, and (3) transferring the data saved to the spare drive to the active drives within the array. Following the completion of the second step, i.e. issuing a write complete status signal, the host system is free to perform other functions.

The third step recited above, i.e., transferring the data saved to the spare drive to the active drives within the array, may be executed at any convenient time following the second step. In systems where a host processor functions as the array controller, this third step may be delayed while higher priority tasks are executed. In systems where the disk array includes an array controller, the array controller coordinates the execution of this third step with other controller or array operations optimize array operation. The data from multiple write I/O operations may be written to the spare drive prior to the step of transferring the data saved to the spare drive to the active drives within the array.

The invention further includes the steps of generating and updating a status table. The status table includes an indentification of storage areas within the spare disk drive which include data requiring transfer to the active array drives. The status table is updated after each write to the spare drive and also as writes from the spare drive into the array are completed.

In the described embodiment, the spare drive which comprises a plurality of physical tracks for the storage of information, has its storage space divided into a plurality of data tracks and a plurality of status tracks. The disk drives even numbered tracks are identified as data tracks while the odd numbered tracks are identified as status tracks. The status table, which is maintained in array controller RAM memory, includes an indentification of storage tracks which include data requiring transfer to said active drives. As data is received from the host system it is written to the first available data track not presently storing data yet to be written into the array. The disk drive write head is then switched to the next sequential track, a status track, and the status table, together with a time stamp, is saved therein. Thus the status table will not be lost in the event of an array or array controller failure.

The above objects and other objects, features, and advantages of the present invention will become apparent from the following detailed specification when read in conjunction with the accompanying drawings in which applicable reference numerals have been carried forward.

DETAILED DESCRIPTION OF THE PREFERRED EMBODIMENT

Array Controller Architecture

Figure 3A:
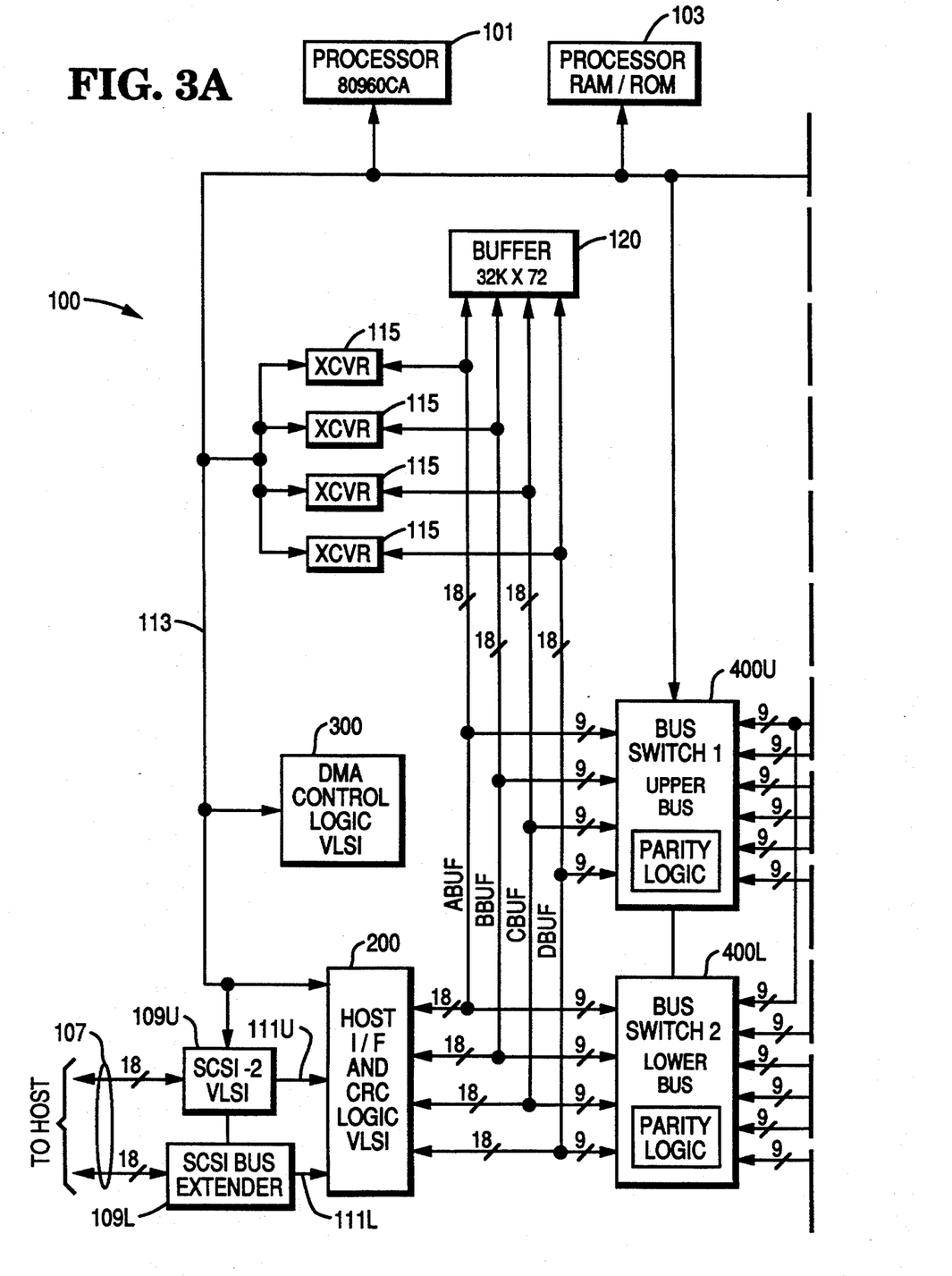
FIGS. 3A and 3B illustrate in block diagram form one possible architecture for disk array controller 100 shown in FIGS. 1 and 2.
Figure 3B:
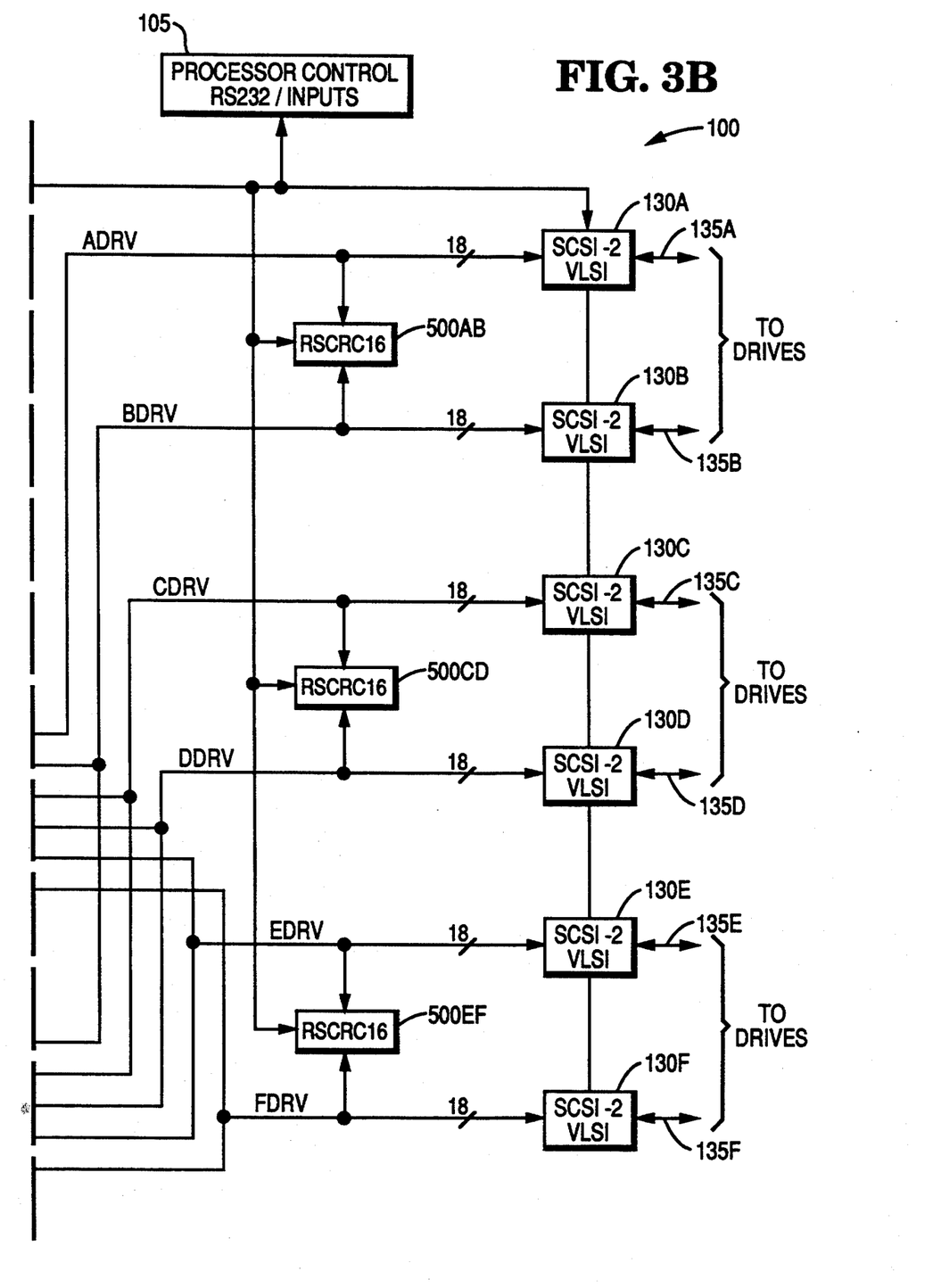

Referring now to FIGS. 3A and 3B, the architecture of a disk array controller 100 for a RAID system is shown in block diagram form. The array controller coordinates the operation of the multitude of disk drives within the array to perform read and write functions, parity generation and checking, and data restoration and reconstruction. The controller exchanges data with the host computer system (not shown) through Host Interface and CRC Logic block 200. Host I/F Logic block 200, under the control of processor 101, interfaces an external 18-bit or 36-bit wide, SCSI-2 bus 107 associated with the host system with four internal 18-bit wide buffer busses ABUF, BBUF, CBUF and DBUF, providing multiplexing functionality between bus 107 and the buffer busses. Bus 107 connects to Host I/F Logic block 200 through a standard SCSI-2 chip set, represented by blocks 109U and 109L and eighteen-bit busses 111U and 111L. Interconnection between block 200 and processor 101 is provided by address/data bus 113. The internal construction and operation of block 200 will be described in greater detail below with reference to FIGS. 4A and 4B.

Internal buffer busses ABUF, BBUF, CBUF and DBUF connect Host I/F Logic block 200 with a RAM buffer 120 and upper and lower byte bus switches 400U and 400L. Buffer 120 possesses the capability to read and write 72-bit wide words from the four buffer busses, or individual 18-bit wide words from any one of the buffer busses. Eighteen or 36-bit access is also provided through transceivers 115 to bus 113.

Bus switches 400U and 400L provides variable bus mapping between buffer busses ABUF, BBUF, CBUF and DBUF and six 18-bit wide drive busses labeled ADRV, BDRV, CDRV, DDRV, EDRV and FDRV, each switch providing routing for one byte (eight bits data and one bit parity) of information. Bus switches 400U and 400L further include the capability to generate parity information, which may be directed onto any of the buffer or drive busses, check parity information and reconstruct information stored on a failed disk drive. FIG. 4, discussed below, provide greater detail concerning the construction and operation of bus switches 400U and 400L.

Each one of drive busses ADRV, BDRV, CDRV, DDRV, EDRV and FDRV is connected to an associated SCSI-2 device, labeled 130A through 130F, which provide connection to six corresponding disk drives (not shown) forming the disk array. The six drives will be identified herein as drives A through F. Reed-Solomon Cyclic Redundancy Check (RSCRC) logic blocks 500AB, 500CD and 500EF are connected between busses ADRV and BDRV, CDRV and DDRV, and EDRV and FDRV, respectively, to provide error detection and generation of Reed-Solomon CRC for the array controller.

The control of Host I/F Logic block 200; bus switches 400U and 400L; RSCRC logic blocks 500AB, 500CD and 500EF; and SCSI devices 109U, 109L, and 130A through 130F is provided by microprocessor 101. Communication between microprocessor 101, associated processor memory 103 and processor control inputs 105 and the above-identified elements is provided by address/data bus 113. Also shown connected to bus 113 is DMA Control Logic block 300. The logic within block 300 provides DMA control for Host I/F Logic block 200, bus switches 400U and 400L, SCSI-2 devices 130A through 130F and processor 101.

Host I/F Logic Architecture

Figure 4A:
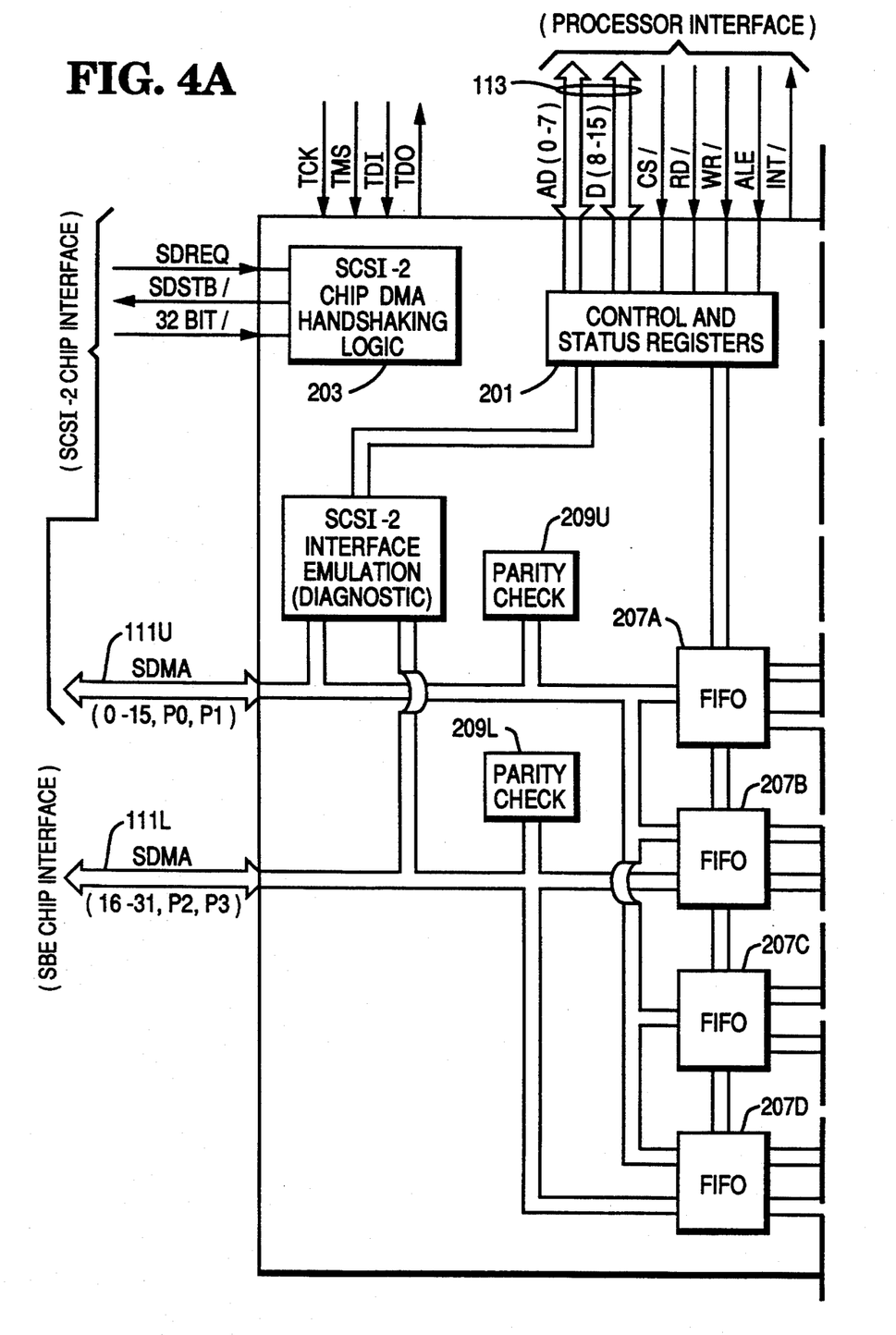
FIGS. 4A and 4B together provide a block diagram illustration of the logic included within Host I/F Logic block 200 shown in FIG. 1.
Figure 4B:
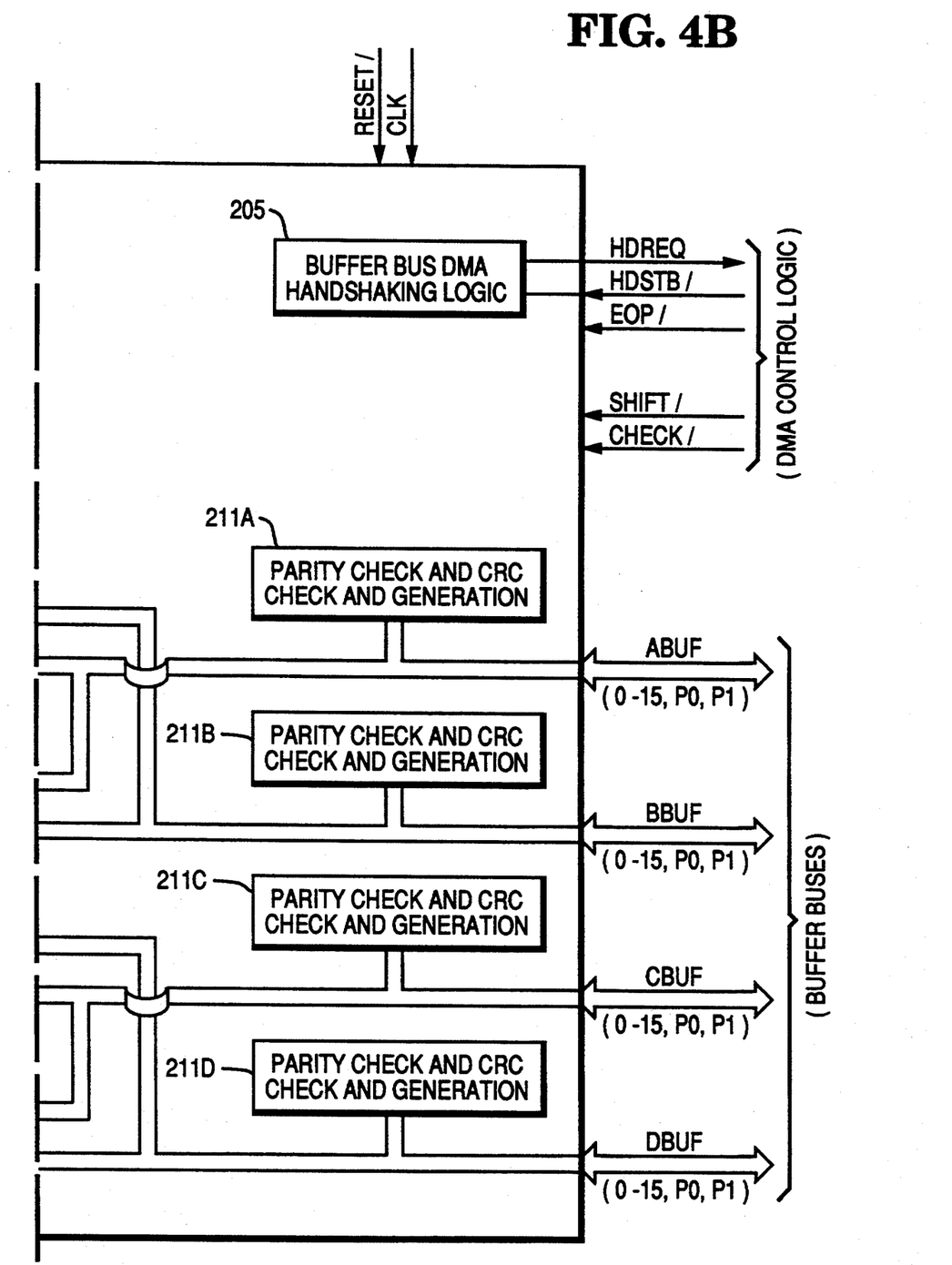

FIGS. 4A and 4B together provide a block diagram illustration of the logic included within Host I/F Logic block 200 shown in FIG. 3A. The Host I/F Logic block includes six major types of internal logic blocks: control and status registers 201, SCSI-2 DMA bus handshaking logic 203, buffer bus DMA handshaking logic 205, FIFO blocks 207A through 207D, parity check blocks 209U and 209L, and parity check and CRC generation blocks 211A through 211D.

Control and status register block 201 contains several 16-bit control registers utilized to configure, control and reset the functions of Host I/F Logic block 200. Block 201 also includes status registers used by controller microprocessor 101 to determine the state of the Host I/F Logic block. Microprocessor access to the control and status registers within block 201 is provided by multiplexed address/data bus AD(0-7), data bus D(8-15), and various control lines for transmitting chip select signal CS/, read signal RD/, write signal WR/, address latch enable signal ALE and interrupt signal INT/. Busses AD(0-7) and D(8-15) are included within address/data bus 113, shown in FIG. 1.

Block 203 contains the SCSI-2 DMA bus handshaking logic necessary to effectuate DMA transfers between Host I/F Logic block 200 and SCSI-2 device 109U. The handshaking logic also controls the multiplexing and demultiplexing of data between SCSI devices 109U and 109L and FIFOs 207A through 207D. Block 203 also modulates request/acknowledge handshaking depending upon the empty or full status of the FIFOs. Buffer bus DMA handshaking logic 205 contains similar handshaking logic for controlling DMA transfers between the Host I/F Logic block and an external buffer bus controller.

The four FIFO blocks 207A through 207D are utilized to eliminate any handshaking dependencies between the Host I/F Logic block and buffer busses ABUF, BBUF, CBUF and DBUF. FIFO blocks 207A and 207B are each connected between bus 111U and buffer busses ABUF and BBUF. FIFO blocks 207C and 207D are each connected between bus 111U and buffer busses CBUF and DBUF. If the controller architecture includes SCSI bus extender device 109L and associated bus 111L, blocks 207B and 207D are also connected to bus 111L. The configuration and operation of the FIFO blocks are controlled by registers within block 201. Each FIFO block can store up to four eighteen bit words (sixteen bits of data and two bits of parity).

Blocks 209U and 209L provide parity check for all information transmitted between the Host I/F Logic block and SCSI-2 devices 109U and 109L, respectively. These blocks generate parity information for the data transfers and compare the generated parity information with the parity information transmitted with the data.

Blocks 211A through 211D provide a parity check for data transfers between the Host I/F Logic block and respective buffer busses. Blocks 211A through 211D also function to generate and append CRC data to DMA data blocks, and to check and remove appended CRC data from DMA data blocks.

In operation Host I/F Logic block 200 is used to multiplex data between SCSI-2 devices 109U and 109L and the four buffer busses ABUF, BBUF, CBUF and DBUF. Block 200 provides multiplexing functionality between busses 111U and 111L and (1) all four buffer busses for 4+1 RAID level 3 and high bandwidth RAID level 5 applications by word stripping data across the four buffer busses in a rotating sequential order, (2) one of two defined pairs of buffer busses for 2+1 RAID level 3 applications by word stripping data across the pair of buffer busses in a rotating sequential order, of (3) any one of the buffer busses for RAID level 1 and single bus RAID level 5 applications.

Additional detail concerning the structure and operation of the Array Controller Architecture discussed earlier and shown in FIGS. 3A and 3B and the Host I/F Logic Architecture discussed above and shown in FIGS. 4A and 4B is provided in U.S. patent application Ser. No. 07/746,399, filed on Aug. 16, 1991, incorporated herein by reference. U.S. patent application Ser. No. 07/746,399, entitled "Disk Array Controller Architecture," is assigned to NCR Corporation.

Bus Switch Architecture

Figure 5:
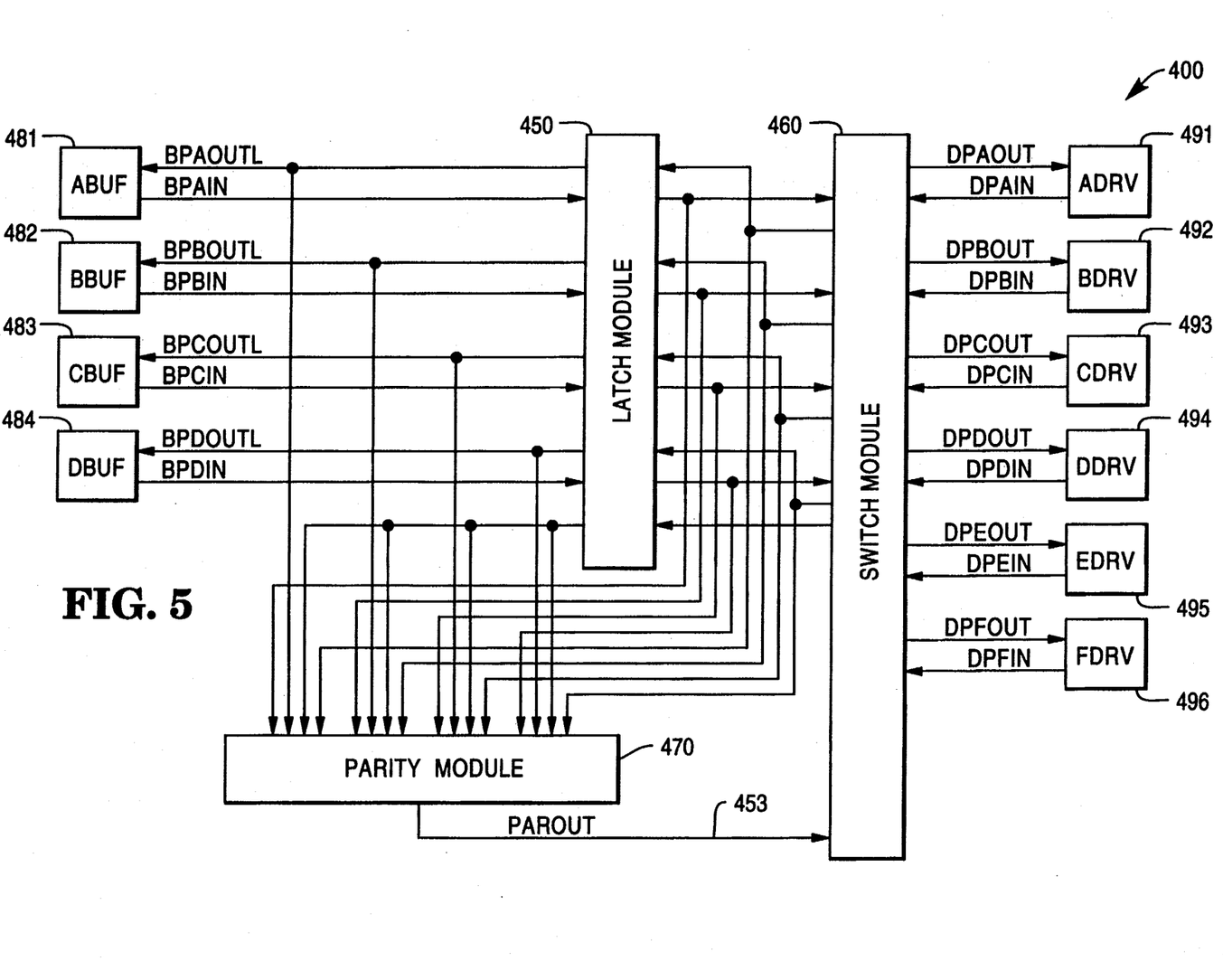
FIG. 5 is a block diagram illustration of the logic included within Bus Switch block 400U shown in FIGS. 3A and 3B.

The logic included within each one of bus switches 400U and 400L is shown in the block diagram of FIG. 5. The structure shown is formed upon a single semiconductor chip. The four host ports, labeled 481 through 484, provide connection to the four controller busses ABUF, BBUF, CBUF and DBUF, respectively. The array ports, identified by reference numerals 491 through 496, connect with the six disk drive busses ADRV, BDRV, CDRV, DDRV, EDRV and FDRV, respectively. Bus switches 400U and 400L operate together to provide a unidirectional connection between any one of controller buses ABUF, BBUF, CBUF and DBUF and any one of drive buses ADRV, BDRV, CDRV, DDRV, EDRV and FDRV. Multiple connections between several controller busses and an equal number of drive busses is also permitted. Additionally, the bus switches may provide unidirectional connection of any controller bus to two or more drive busses. Parity information obtained via bus 453 can also be ported to any one of the drive busses.

The architecture of each bus switch is composed of three primary blocks: a latch module 450, switch module 460, and a parity module 470. Switch module 460 is connected between controller busses ABUF, BBUF, CBUF and DBUF and drive busses ADRV, BDRV, CDRV, DDRV, EDRV and FDRV. An additional bus 453 connects parity module 470 to bus switch module 460. Several functions are provided by bus switch module 460. First, bus switch module 460 provides a unidirectional connection between any controller bus and any drive bus. Multiple connections between several controller busses and an equal number of drive busses is also permitted.

Second, the bus switch module provides connection between any two or more of the drive busses. Such an operation is necessary for the transfer of information between disk drives without interfering with host or controller operations.

Third, bus switch module 460 provides connection between any two or more of the controller busses. This mode of operation supports data reorganization on the controller by allowing data to be propogated from one controller bus to another. This mode of turnaround operation is also advantageous for BIST (Built-In Self Test) development.

Finally, the bus switch module provides unidirectional connection of any controller bus to one or more drive busses. Parity information obtained via bus 453 can also be ported to any one of the drive busses.

Parity module 470 includes connections to each of the controller busses for receiving data therefrom and a connection to bus 453 for providing parity information to bus switch module 460. Parity module 470 generates parity information for RAID level 3, 4 and 5 operations by performing a bit-wise exclusive-OR of each active controller bus. The parity information is provided to bus switch module 460 via bus 453.

Additional detail concerning the structure and operation of bus switches 400U and 400L discussed above and shown in FIG. 5 is provided in U.S. patent application Ser. No. 07/701,921, filed on May 17, 1991, incorporated herein by reference. U.S. patent application Ser. No. 07/701,921, entitled "Multi-Channel Data And Parity Exchange Device," is assigned to NCR Corporation.

Fast Write I/O Operation

The present invention, one embodiment of which will now be described, makes use of the array spare drive or drives to reduce the apparent response time of write I/O operations to the host system. For the system shown in FIGS. 1 through 5, spare drive DRIVE F is utilized for this purpose.

Figure 6:
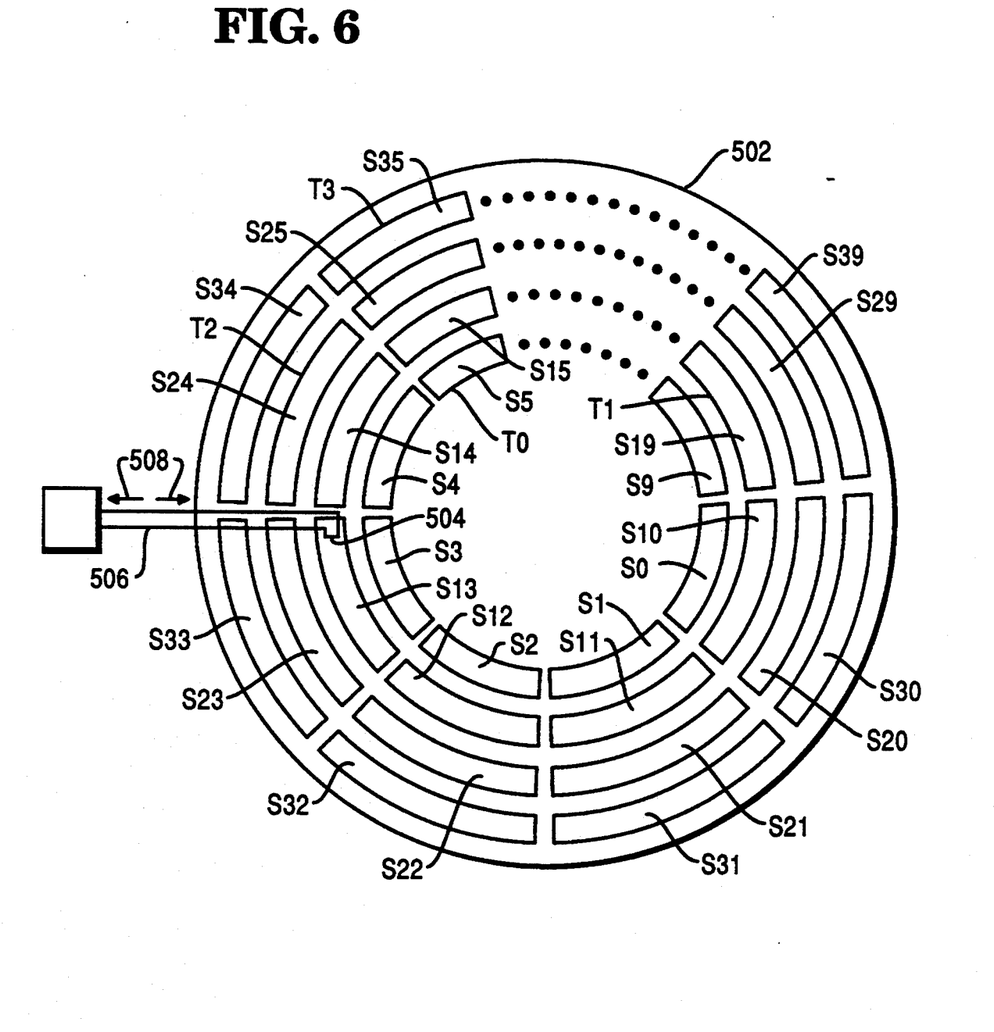
FIG. 6 is a top view of a magnetic disk illustrating the organization of data in tracks and sectors on the surface of the disk.

Disk drive unit DRIVE F is illustrated in FIG. 6. The disk drive unit shown, simplified for illustration, includes a magnetic disk 502 having its surface coated with a magnetizable material and a read/write head 504 attached to a movable arm 506. Data is recorded onto the disk in a concentric set of rings T0 through T3, called tracks. Arm 506 is movable in the directions indicated by arrows 508 to position head 504 over any one of tracks T0 through T3. Each track is seen to be divided into sections identified as sectors, wherein blocks of data are stored. The sectors corresponding to tracks T0, T1, T2 and T3 have been numbered S0 through S9, S10 through S19, S20 through S29, and S30 through S39, respectively. As stated earlier, the disk drive unit shown in FIG. 6 is examplary only, actual disk drive units may include one or more magnetic disks or platters and multiple read/write heads for each disk. Read/write heads may also be provided to provide access to the bottom surface of the magnetic disks. Each disk surface will also include a great many more than the four tracks and forty sectors shown in FIG. 6.

As described above, spare drive DRIVE F, referred to as a fast write disk, has its storage space divided into a plurality of tracks, T0, T1, T2, T3, etc. wherein consecutive track numbers correspond to adjacent tracks. The method of the present invention utilizes the even numbered tracks, e.g., T0 and T2, identified as data tracks, and odd numbered tracks, e.g., T1 and T3, identified as status tracks, as will be explained below with reference to FIGS. 7 through 10. The objective of the present invention is to quickly store incoming write I/O blocks to the fast write drive on the data tracks and quickly return completion status to the host system, without waiting for write completion FIGS. 7 through 11 illustrate the fast write I/O operation wherein data received from host 147 is written to disk drive DRIVE F, referred to as the fast write drive (FWD) in accordance with the method of the present invention. Only structure required to facilitate the fast write operation is shown in FIGS. 7 through 11.

Figure 7:
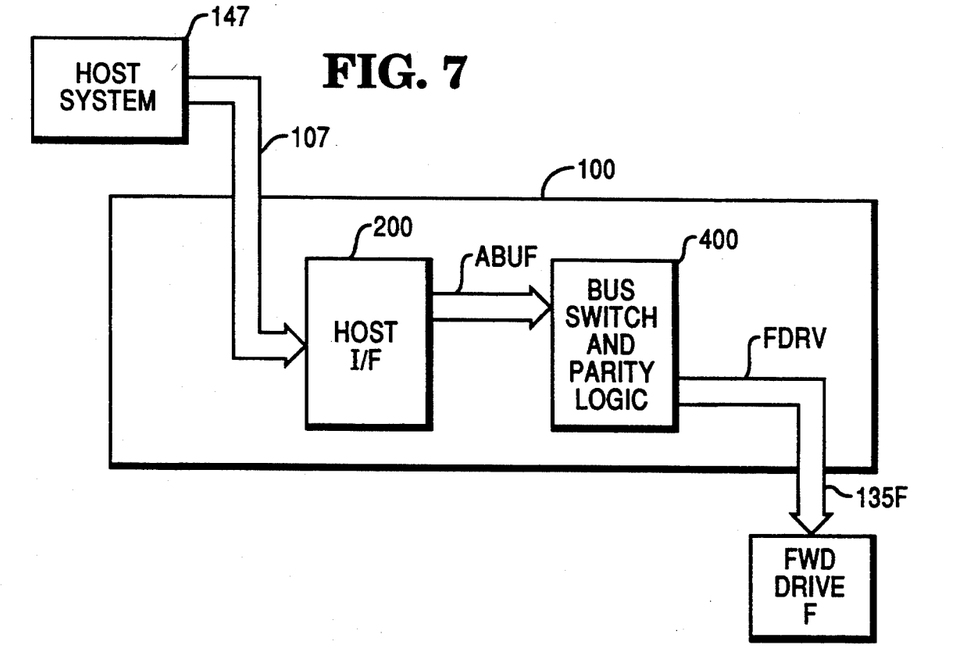
FIG. 7 illustrates the first step in the fast write operation of the present invention wherein the spare disk drive shown in FIGS. 1 and 2 is utilized to reduce the apparent response time of a disk array write operation.

FIG. 7 illustrates the first step in the fast write operation. Under direction of the controller processor 101, not shown, each data block received by array controller 100 to be written to the disk array is immediately routed via host I/F 200, one of buffer busses ABUF through DBUF, bus switch 400 and drive bus FDRV to the fast write drive, DRIVE F, and written to the first available data track.

Figure 8:
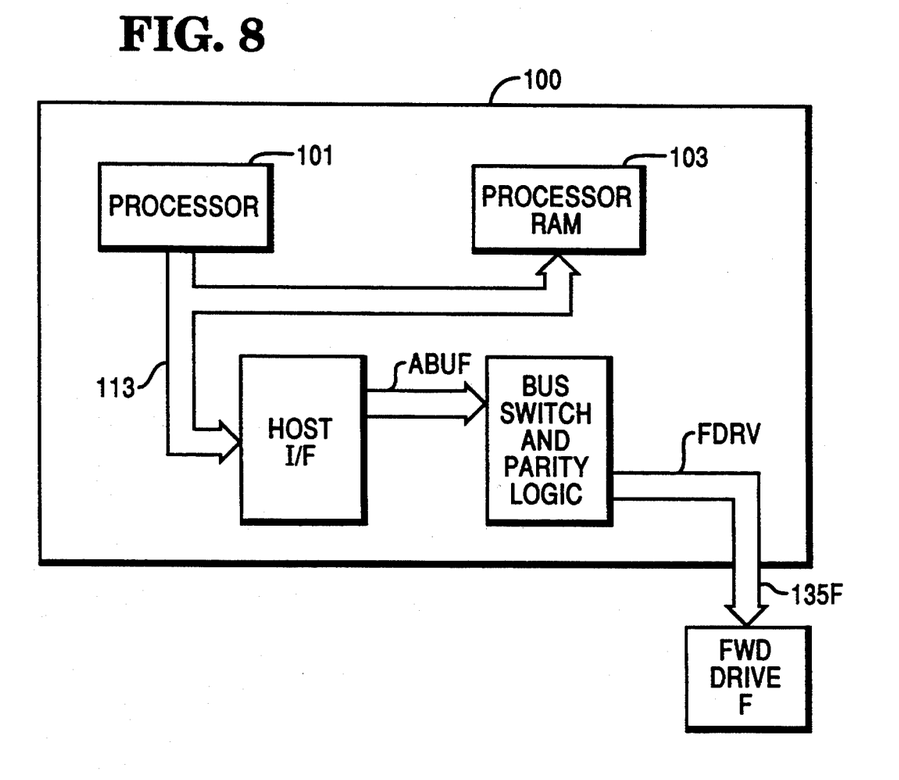
FIG. 8 illustrates the second step in the fast write operation wherein a status table is saved to temporary memory and, together with a time stamp, to the spare disk drive shown in FIGS. 1 and 2.

Controller 101 maintains a status table indicating the current status of each FWD data track. Following completion of each block write to a FWD data track, processor 101 updates the status table and saves the updated table to RAM 103 and, together with a time stamp, to the FWD at the succeeding status track. The array controller is configured as shown in FIG. 8 during this step. A write completion status signal is thereafter provided from the array controller to the host system. The host is thus free to proceed with other operations while the array controller independently completes the write operation.

Figure 9:
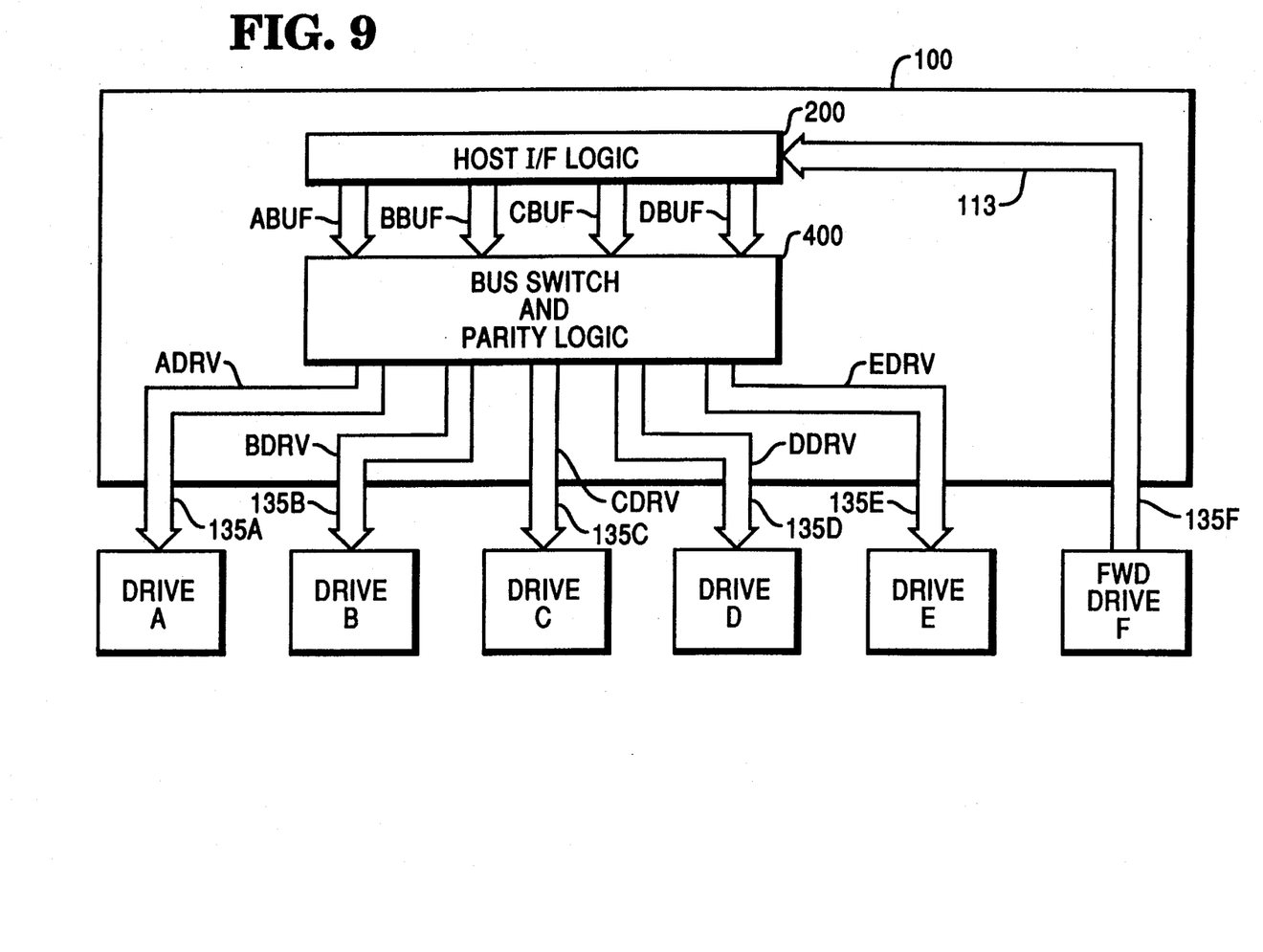
FIG. 9 illustrates the completion of a RAID level 3 write operation following the fast write operation shown in FIGS. 7 and 8.
Figure 10:
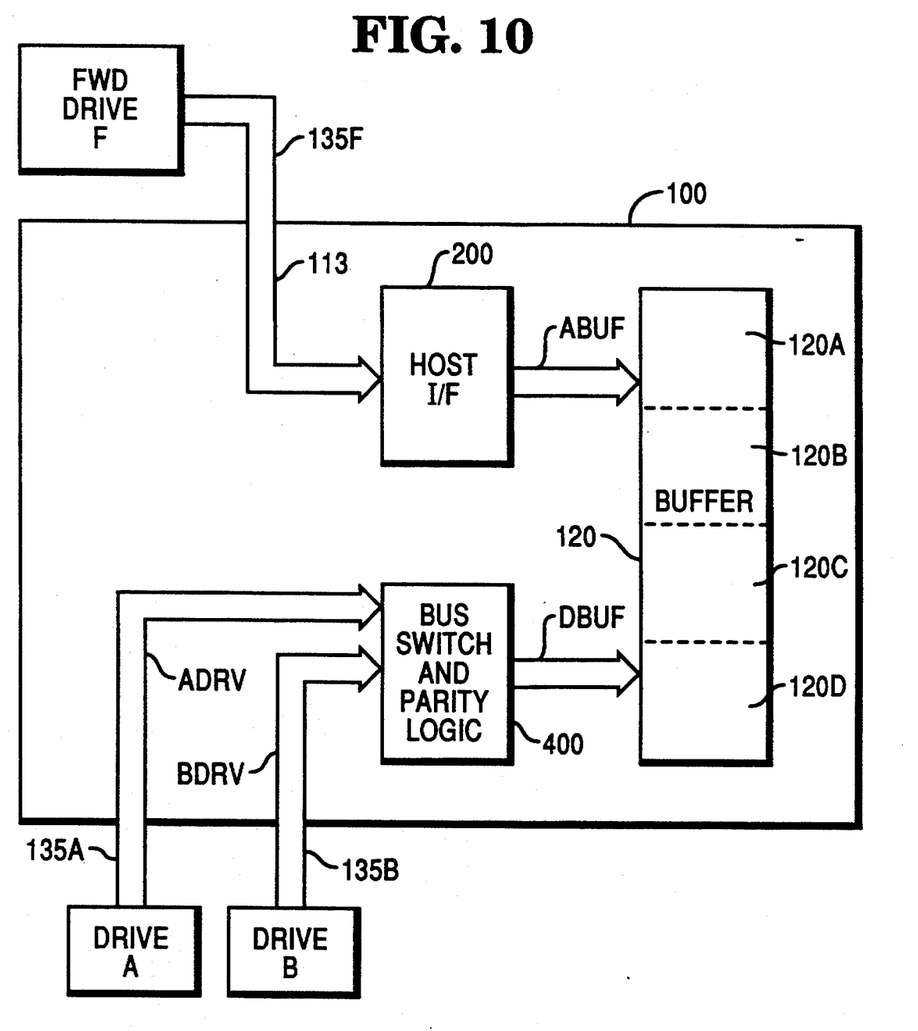
FIG. 10 illustrates the step of reading old data and parity information from the data, parity and spare array drives in accordance with the RAID level 5 read-modify-write operation following the fast write operation shown in FIGS. 7 and 8.
Figure 11:
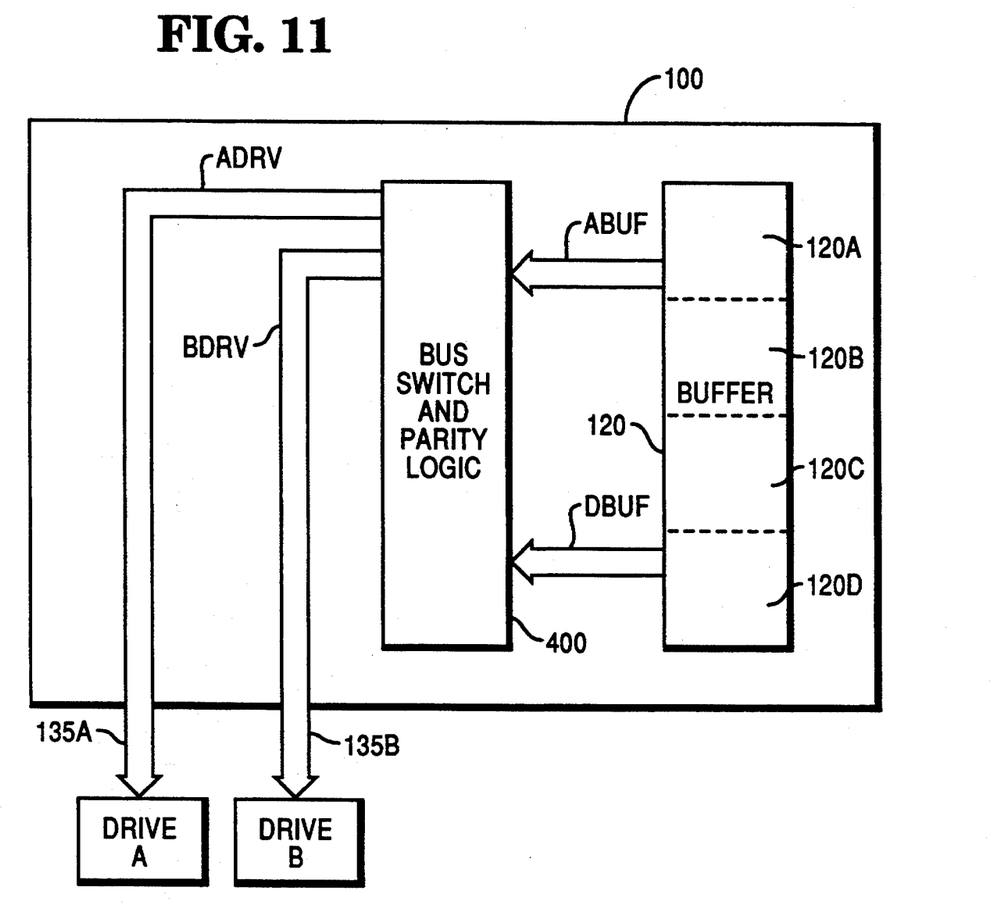
FIG. 11 illustrates the step of writing new data and parity information to the data and parity array drives, completing the RAID level 5 read-modify-write operation following the fast write operation shown in FIGS. 7 and 8.

The process employed within the array controller for completing a RAID level 3 write operation following the write to FWD DRIVE F is shown in FIG. 9. FIGS. 10 and 11 illustrate the process for completing a RAID level 5 write operation.

Referring now to FIG. 9, under direction of array controller processor 101, the data previously saved to FWD DRIVE F is read from DRIVE F into host I/F logic 200. The array controller processes and stores the data received from FWD DRIVE F in the same manner as data received from the host system would be processed absent the employment of the present fast write I/O operation. The data received from FWD DRIVE F is multiplexed or striped across buffer busses ABUF through DBUF by the logic within host I/F logic 200, and routed through bus switch 400 for storage on drives DRIVE A through DRIVE D. Parity information is concurrently generated by the parity logic within bus switch 400 and written to DRIVE E.

FIGS. 10 and 11 illustrate a RAID level 5 write involving DRIVE A and DRIVE B, wherein data is to be written to DRIVE B and parity information is to be updated on DRIVE A. Under direction of the controller processor, not shown, old data and parity information are first read from the two drives as shown in FIG. 10. The old data and parity are read from the target areas within drives DRIVE B and DRIVE A, respectively, and routed via buses 135B and 135A to bus switch 400. Bus switch 400 is configured to combine the received data and parity to generate the exclusive-OR product: old data XOR old parity. This product is stored in a first area 120D within buffer 120. The data previously saved to FWD DRIVE F is read from DRIVE F into host I/F logic 200. The new data received from FWD DRIVE F is saved to a second area 120A within buffer 120.

New data and parity information is then written to DRIVE B and DRIVE A as shown in FIG. 11. Bus switch 400 is reconfigured to route the new data read from area 120A in storage buffer 120 to DRIVE B. Bus switch 400 is further configured to generate new parity information by combining the new data with the previously saved product, old data XOR old parity, stored in storage buffer area 120D. The result, old data XOR old parity XOR new data, is written to DRIVE A.

The status table is updated as writes complete in the array. The status table includes for each data track an indication of whether or not the track holds data not yet written into the disk array. For data tracks holding data that has been written into the array, the status table further includes the logical block number associated with the write and a corresponding host I/O identification. The status table is saved with a time stamp when written to the FWD so that in the event of a controller or power failure the most recently saved status table can be recovered by reading all the status tracks and retaining the table having the latest time stamp.

For simplicity, the description provided above assumes that each write I/O request from host 147 is for a write of a single data block that will occupy one sector on a disk. A more general technique for handling multiple block writes is an obvious extension of the single block write operation described here and is included by the present invention.

It can thus be seen that there has been provided by the present invention a new and useful method for reducing mean write I/O response time for a disk array within a data processing system by utilizing one or more spare disk drives within the disk drive for rapid temporary storage of I/O write data and returning completion status to the host system without waiting for the completion of write operations in the array. The described method results in significant improvements in I/O response times when utilized within RAID level 4 and 5 disk array systems employing read-modify-write algorithms. Although the described method may also be utilized within RAID level 1 and 3 and other array configurations, the gains in I/O response times are much less significant than in RAID level 4 and 5 disk array configurations.

To protect data reliability, the status table and fast write data can be saved to both the controller RAM as well as to the spare drive. Thereby, a single failure of either the spare drive or the controller will not result in a loss of data.

In RAID level 4 or 5 disk array systems, additional array performance benefits are realized by employing the present invention together with the method shown in U.S. patent application Ser. No. 07/966,106, titled "Delayed Initiation of Read-Modify-Write Parity Operations in a Raid Level 5 Disk Array" by Keith Bernard DuLac and Robert Allen DeMoss, the disclosure of which is hereby incorporated by reference. U.S. patent application Ser. No. 07/966,106, discloses a method for minimizing I/O service times and I/O queue waiting times for individual drives within a RAID level 4 or 5 disk array by seperating data and parity write operations within the array. U.S. patent application Ser. No., 07/966,106, filed concurrently herewith, is assigned to NCR Corporation.

Although the presently preferred embodiment of the invention has been described, it will be understood that various changes may be made within the scope of the appended claims.

What is claimed is:

1. A method for reducing response time for write input/output (I/O) operations initiated by a host system to a disk array, said disk array including a plurality of active drives for storing data and parity information and a spare disk drive; said method comprising the steps of:

saving data received by said disk array from said host system to said spare disk drive;

issuing a write complete status signal indicating completion of said write I/O operation to said host system; and transferring said data saved to said spare disk drive to said active drives.

2. The method according to claim 1, wherein said step of saving data to said spare disk drive and said step of issuing a write complete status signal are repeated for a plurality of write I/O operations initiated by said host system to said disk "array prior to the execution of said step of transferring the data saved to said spare disk drive to said active drives.

3. The method according to claim 1, further comprising the steps of:
generating a status table, said status table including an indentification of storage areas within said spare disk drive which include data requiring transfer to said active disk drives; and
updating said status table upon the conclusion of said step of saving data received by said disk array from said host system to said spare disk drive.

4. The method according to claim 3, wherein:
said spare disk drive comprises a data storage disk including a plurality of storage tracks;
said step of saving data received by said disk array from said host system to said spare disk drive includes the step of saving said received data to a first storage track;
said status table includes an indentification of storage tracks which include data requiring transfer to said active drives; and
said method further comprising the step of saving said status table to a second storage track upon the conclusion of said step of saving data received by said disk array from said host system to said spare disk drive.

5. The method according to claim 4, wherein:
said second storage track is located adjacent to said first storage track on said data storage disk.

6. The method according to claim 3, further comprising the step of:
updating said status table upon the conclusion of said step of transferring the data saved to said spare disk drive to said active drives.

7. The method according to claim 6, wherein:
said status table includes a time stamp indicating the time when said status table was last updated.

8. In a data processing system including a host processor and a disk array; said disk array comprising an array controller, a plurality of active disk drives for storing data received from said host processor and parity information, and a spare disk drive; a method for reducing response time for write I/O operations initiated by said host system to said disk array; said method comprising the steps of:
saving data received by said disk array from said host system to said spare disk drive;
generating a status table, said status table including an indication of whether data saved to said spare disk drive has been transferred to said active drives; and
saving said status table to said spare disk drive;
issuing a write complete status signal indicating completion of said host write I/O operation to said host system; and
transferring the data saved to said spare disk drive to said active drives.

9. The method according to claim 8, wherein:
said array controller includes a RAM memory; and
said method further comprises the step of saving said RAM memory.

10. The method according to claim 8, wherein:
said disk array is a configured in accordance with RAID level 3, said disk array including N active disk drives; and
said step of transferring the data saved to said spare disk drive to said active drives comprises the steps of:
reading the data saved to said spare disk drive;
dividing said data into N−1 data segments;
combining said N−1 data segments in an exclusive-OR operation to generate a parity segment; and
writing said N−1 data segments and said parity segment to respective ones of said N active drives.

11. The method according to claim 8, wherein:
said disk array is a configured in accordance with RAID level 5, said disk array including first and second disk drives for the storage of data and parity information, respectively; and
said step of transferring the data saved to said spare disk drive to said active drives comprises the steps of:
reading the data saved to said spare disk drive;
reading old data and old parity information from said first and second disk drives, respectively;
combining said old data, said old parity information, and the data read from said spare disk drive in an exclusive-OR operation to generate new parity information; and
writing the data read from said spare disk drive and said new parity information to said first and second disk drives, respectively.

12. A method for reducing response time for write I/O operations initiated by a host system to a disk array, said disk array including a plurality of active drives for storing data and parity information and a spare disk drive, said spare disk drive comprising a data storage disk including a plurality of sequentially-numbered storage tracks; said method comprising the steps of:
(A) saving data received by said disk array from said host system to said spare disk drive onto the first available, even-numbered, storage track;
(B) generating a status table, said status table including an indentification of storage tracks which include data saved to said spare disk drive which has not been written to said active array drives
(C) saving said status table to said spare disk drive onto the odd-numbered storage track succeeding said first available, even-numbered, storage track;
(D) issuing a write complete status signal indicating completion of said host write I/O operation to said host system; and
(E) transferring the data saved to said spare disk drive to said active drives.

13. The method according to claim 12, wherein said steps (A) through (B) are repeated for a plurality of write I/O operations initiated by said host system to said disk array prior to the execution of step (E).

* * * * *